United States Patent [19]

Lewis et al.

[11] Patent Number: 4,715,645
[45] Date of Patent: Dec. 29, 1987

[54] BUMPER BAR FOR A MOTOR VEHICLE

[75] Inventors: Idris Lewis, Chelmsford; John Churchill, Southend on Sea, both of United Kingdom

[73] Assignee: Ford Motor Company, Dearborn, Mich.

[21] Appl. No.: 21,101

[22] Filed: Mar. 3, 1987

[30] Foreign Application Priority Data

Mar. 12, 1986 [GB] United Kingdom ................ 8606163

[51] Int. Cl.$^4$ ............................................. B60R 19/08
[52] U.S. Cl. .................................. 296/120 R; 296/155
[58] Field of Search ............... 293/120, 121, 132, 133, 293/136, 155

[56] References Cited

U.S. PATENT DOCUMENTS

| | | | |
|---|---|---|---|
| 3,666,310 | 5/1972 | Burgess et al. | 293/120 |
| 3,856,613 | 12/1974 | Weller | 293/120 |
| 4,361,352 | 11/1982 | Wakamatsu | 293/120 |
| 4,427,189 | 1/1984 | Kimura et al. | 293/136 |
| 4,504,534 | 3/1985 | Adachi et al. | 293/120 |
| 4,616,866 | 10/1986 | Loren et al. | 293/120 |

FOREIGN PATENT DOCUMENTS

A1068834  5/1967  United Kingdom .
A1361893  7/1974  United Kingdom .

Primary Examiner—Robert R. Song
Attorney, Agent, or Firm—Daniel M. Stock; Clifford L. Sadler

[57] ABSTRACT

A plastic bumper bar for a motor vehicle has an outer skin, integral mounting brackets by which the bumper can be mounted on a vehicle and a strap stretched between two mounting brackets, the interior of the skin being filled with a plastic foam which is molded in situ and encapsulates the strap completely, the presence of the strap helping to absorb energy.

16 Claims, 3 Drawing Figures

BUMPER BAR FOR A MOTOR VEHICLE

BACKGROUND OF THE INVENTION

This invention relates to a bumper bar for a motor vehicle, and in particular to a bumper bar made largely from plastic materials.

Bumper bars of plastic are now widely used. they have advantages in allowing great styling flexibility, relatively low weight and the ability to absorb minor impacts without any permanent damage. However, to allow the bumper to absorb such minor impacts without damage to the bumper itself or without damage to the vehicle body behind the bumper, it has often been necessary to form the bumper so that it projects a substantial distance from the body. This is undesirable from the point of view of appearance and because it increases the overall vehicle length.

SUMMARY OF THE INVENTION

According to the invention, there is provided a vehicle bumper comprising a plastic skin, internal brackets molded integrally with the skin for mounting the bumper on a vehicle, a metal strap extending across the bumper, inside the skin, and supported at its ends by the brackets, and a plastic foam filling molded in situ within the skin and encapsulating the strap.

The internal strap is put under tension between the brackets in the event of an impact and thus absorbs the energy of the impact. Supporting the strap between the mounting brackets allows the strap to be close to the front of the bumper and thus allows the dimensions of the bumper to be kept small.

Preferably the strap is of metal, although it could be possible to form it of a plastic material.

The strap can be simply clipped at each end to a bumper mounting bracket, and in this case assembly is very easy. The bumper preferably has integral wrap-around ends which extend along the side of the vehicle body.

The skin of the bumper may be very thin, for example, less than 1.5 mm thick, and preferably 1.2 mm. When the skin is so thin, the foam extends over the whole of the inner surface of the skin, to provide reinforcement to all parts of the skin.

BRIEF DESCRIPTION OF THE DRAWINGS

The invention will not be further described, by way of example, with reference to the accompanying drawings, in which.

DESCRIPTION OF THE PREFERRED EMBODIMENT

Figure 1:
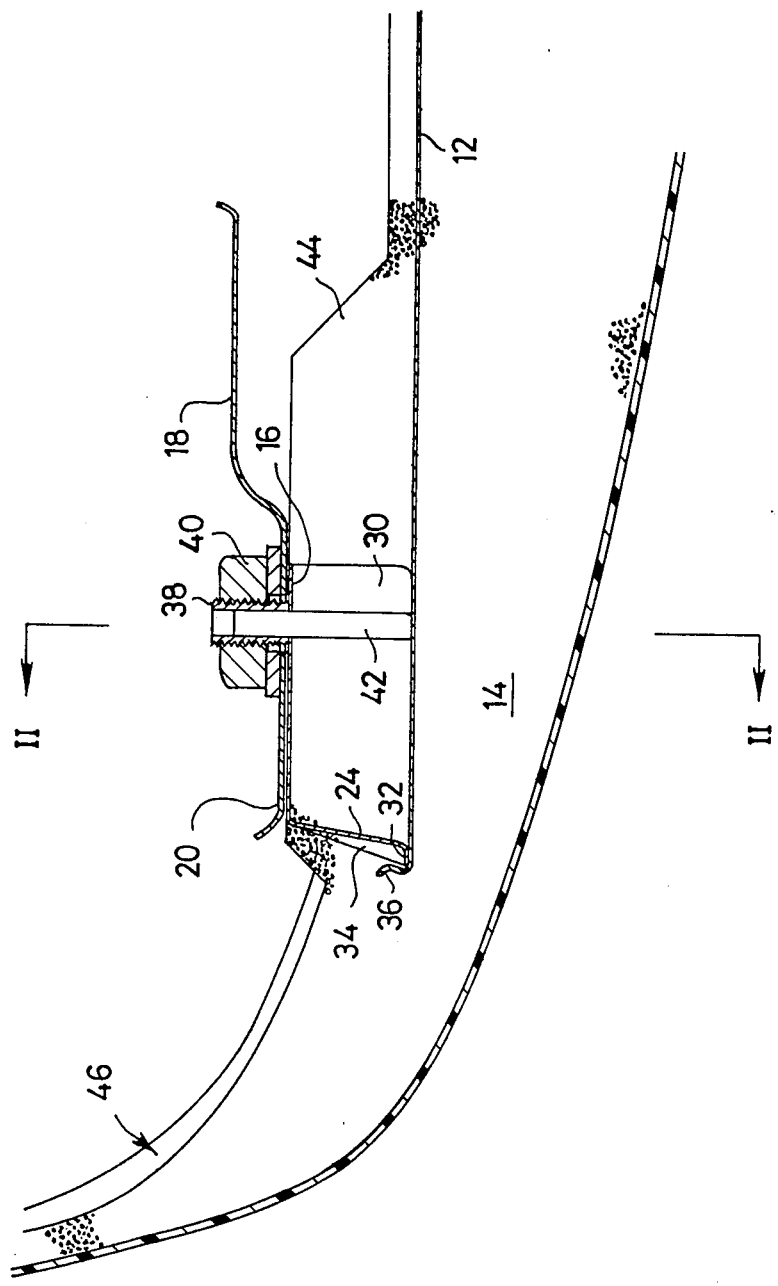
FIG. 1 is a top view of one corner of a bumper in accordance with the invention.

The bumper shown in the figures has a skin 10, an internal metal strap 12 and a foam filling 14. A mounting bracket 16 is molded integrally with the skin. The bumper is shown in position against a part 18 of the vehicle body to which the bumper will be mounted.

The skin 10 can be injection molded from polycarbonate to have a thickness of 1.2 mm. The strap 12 can be of steel and the foam 14 can be a polyurethane foam.

Figure 2:
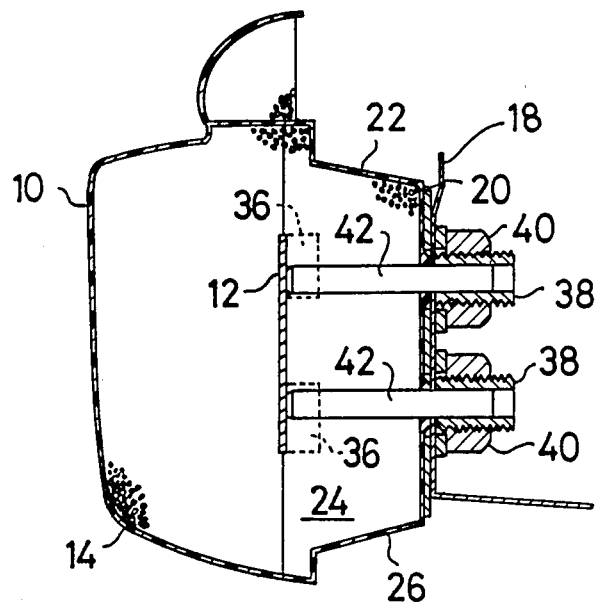
FIG. 2 is a section through the bumper of FIG. 1 on the line II—II.
Figure 3:
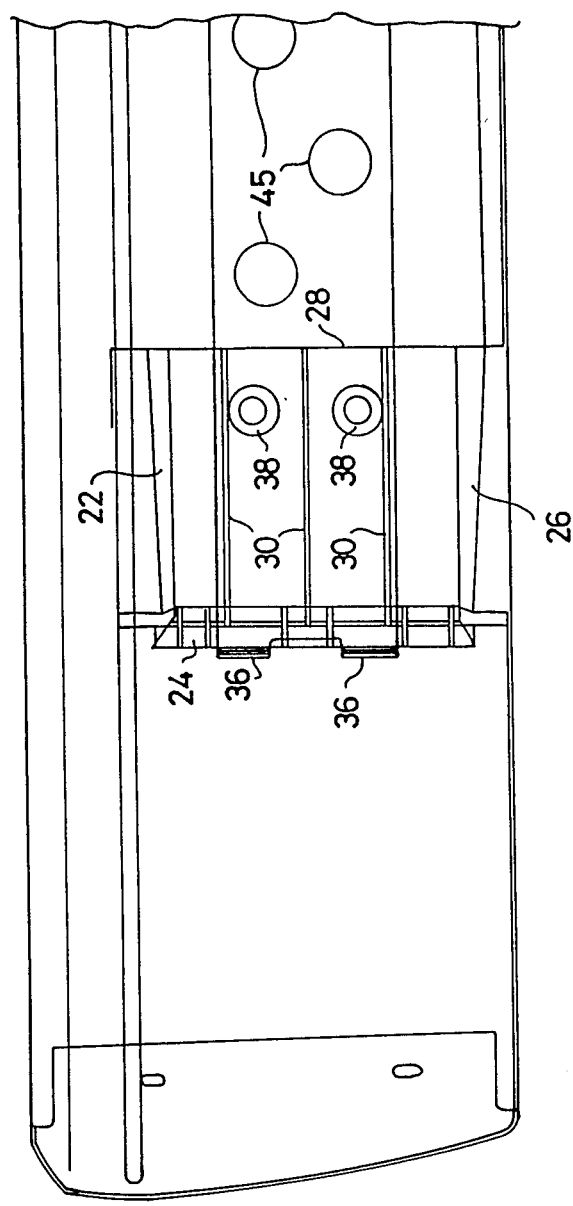
FIG. 3 is a view of the back (or inside) of the bumper before foaming.

The form of the mounting bracket 16 can be seen most clearly from FIGS. 2 and 3. It has a flat top face 20 and three walls 22, 24 and 26 each extending from one of three sides of the face 20. The fourth side 28 of the face 20 has no wall. The walls 22 and 26 are directly connected to the skin 10 (FIG. 2). The wall 24 is supported at each end by being connected to the walls 22 and 26. Stiffening ribs 30 brace the wall 24 against the underside of the face 20 and extend parallel to, and to the full depth of the end walls 22 and 26.

At the foot of the wall 24, there is a lip 32. This is braced by ribs 34 against the wall 24.

The strap 12 has a bifurcated end with two inturned integral clips 36 which clip over the lip 32 as shown in FIG. 1. This engagement of the strap 12 with the bracket 16 supports the strap 12 in the bumper.

There are two brackets 16, one adjacent each lateral end of the bumper, and the strap 12 is stretched between the two brackets 16.

The outward facing side of the face 20 also has two integrally molded plastic threaded bosses 38 which are used to secure the bumper to the body part 18 of the vehicle. The bosses 38 are passed through holes in the vehicle body and plastic nuts 40 are screwed on. To stiffen the bosses 38 and to help them to resist shearing forces, the bosses 38 are hollow and are provided with internal metal pins 42 which are press fit into the hollow bushes. The pins 42 are initially pushed in until they touch the strap 12.

Once the strap 12 has been assembled to the brackets 16, the bumper is placed in a foaming box and the foam 14 is cast into the interior so that it completely encapsulates the strap 12 and forms a rear exposed surface 44 which is a continuation of the face 20 of the bracket 16. The strap 12 can have holes formed in it, as at 45, so that the foam 14 can extend all around it. Although the foam 14 may well in practice adhere to the strap 12, this is not necessary and the bumper would still function correctly if there were no holes 45 and a release agent had been applied to the strap 12 to prevent any adherence. The foam 14 will, however, bond to the inside surface of the skin 10.

The bumper has wrap-around ends 46 which extend along the side of the vehicle, for example, up to the wheel opening in the vehicle fender. Because the skin 10 is made very thin, the foam filling extends over the whole internal surface to support the skin 10.

In use, an impact occurring between the brackets 16 initially causes elastic deformation of the skin 10 and of the foam filling 14, which both absorb energy. As the effect of the impact moves further into the bumper, the strap 12 is deflected backwards and is put into tension between its ends 36. As the tension in the strap 12 increases, so does the amount of energy absorbed. When the strap 12 is deflected, the pins 42 are pushed back against the resistance of the press fit through the centers of the bosses 38, and this also helps to absorb energy.

What is claimed is:

1. A bumper comprising a plastic skin, brackets molded integrally with the skin adapted for mounting the bumper on a vehicle, a strap extending across the bumper laterally with respect to the vehicle, inside the skin, and supported at its ends by the brackets, and a plastic foam filling molded in situ within the skin and encapsulating the strap.

2. A bumper as defined in claim 1, wherein the strap is formed of metal.

3. A bumper as defined in claim 1, wherein the strap is clipped at each end to the bumper mounting brackets.

4. A bumper as defined in claim 2, wherein the strap is clipped at each end to the bumper mounting brackets.

5. A bumper as defined in claim 1, wherein the skin of the bumper is less than 1.5 mm thick.

6. A bumper as defined in claim 4, wherein the skin of the bumper is less than 1.5 mm thick.

7. A bumper as defined in claim 5, wherein the skin of the bumper is 1.2 mm thick.

8. A bumper as defined in claim 6, wherein the skin of the bumper is 1.2 mm thick.

9. A bumper as defined in claim 1 and further comprising integral wrap-around ends adapted to extend along the side of the vehicle body.

10. A bumper as defined in claim 5 and further comprising integral wrap-around ends adapted to extend along the side of the vehicle body.

11. A bumper as defined in claim 5, wherein the foam extends over the whole of the inner surface of the skin, to provide reinforcement to all parts of the skin.

12. A bumper as defined in claim 7, wherein the foam extends over the whole of the inner surface of the skin, to provide reinforcement to all parts of the skin.

13. A bumper as defined in claim 1, wherein each bracket is of plastic and has a flat top face and walls extending from the top face on three sides, the walls forming the connection between the top face and the skin, and the top face carrying an integrally molded threaded boss by which the bumper can be attached to a vehicle.

14. A bumper as defined in claim 13, wherein the boss is hollow and a metal pin is inserted into the cylindrical cavity through the boss, the pin extending through the boss and through the flat top face.

15. A bumper as defined in claim 13, wherein the wall on one of the three sides incorporates a lip over which the strap is clipped, and wherein stiffening ribs are molded in to brace the lip against the wall and to brace the wall against the flat top face.

16. A bumper as defined in claim 14, wherein the wall on one of the three sides incorporates a lip over which the strap is clipped, and wherein stiffening ribs are molded in to brace the lip against the wall and to brace the wall against the flat top face.

* * * * *